United States Patent
Palmer et al.

(10) Patent No.: US 11,587,374 B2
(45) Date of Patent: Feb. 21, 2023

(54) SYSTEMS AND METHODS FOR CAPTURING AND OFFLOADING DIFFERENT INFORMATION BASED ON EVENT TRIGGER TYPE

(71) Applicant: SmartDrive Systems, Inc., Westlake, TX (US)

(72) Inventors: Jason Palmer, Carlsbad, CA (US); Mark Freitas, San Diego, CA (US); Daniel A. Deninger, Carlsbad, CA (US); David Forney, La Jolla, CA (US); Slaven Sljivar, San Diego, CA (US); Alekh Vaidya, San Diego, CA (US); Jeffrey Griswold, San Diego, CA (US)

(73) Assignee: SmartDrive Systems, Inc., Westlake, TX (US)

( * ) Notice: Subject to any disclaimer, the term of this patent is extended or adjusted under 35 U.S.C. 154(b) by 96 days.

(21) Appl. No.: 17/079,902

(22) Filed: Oct. 26, 2020

(65) Prior Publication Data
US 2021/0043016 A1    Feb. 11, 2021

Related U.S. Application Data

(63) Continuation of application No. 15/151,877, filed on May 11, 2016, now Pat. No. 10,818,109.

(51) Int. Cl.
*G07C 5/08* (2006.01)
*B60R 1/00* (2022.01)

(52) U.S. Cl.
CPC ............. *G07C 5/0841* (2013.01); *B60R 1/00* (2013.01); *B60R 2300/80* (2013.01)

(58) Field of Classification Search
None
See application file for complete search history.

(56) References Cited

U.S. PATENT DOCUMENTS

| | | |
|---|---|---|
| 5,680,123 A | 10/1997 | Lee |
| 5,978,017 A | 11/1999 | Tino |
| 6,298,290 B1 | 10/2001 | Abe |
| 6,574,538 B2 | 6/2003 | Sasaki |
| 6,812,831 B2 | 11/2004 | Ikeda |

(Continued)

FOREIGN PATENT DOCUMENTS

| | | |
|---|---|---|
| KR | 20150098039 | 8/2015 |
| WO | 2014146658 | 9/2014 |

OTHER PUBLICATIONS

Randler; Machine translation of WO 2014/146658, Sep. 25, 2014, espacenet.com, 4 pages.

(Continued)

*Primary Examiner* — David P. Merlino
(74) *Attorney, Agent, or Firm* — Esplin & Associates, PC

(57) ABSTRACT

This disclosure relates to a system and method for detecting vehicle events. The system includes sensors configured to generate output signals conveying information related to the vehicle. The system detects a vehicle event based on the information conveyed by the output signals. The system selects a subset of sensors based on the detected vehicle event. The system captures and records information from the selected subset of sensors. The system transfers the recorded information to a remote server or provider.

16 Claims, 3 Drawing Sheets

(56) References Cited

U.S. PATENT DOCUMENTS

| | | |
|---|---|---|
| 7,804,426 B2 | 9/2010 | Etcheson |
| 8,666,590 B2 | 3/2014 | Follmer |
| 8,849,501 B2 | 9/2014 | Cook |
| 9,240,079 B2 | 1/2016 | Lambert |
| 9,580,009 B1 | 2/2017 | Lenker |
| 10,735,693 B2* | 8/2020 | Arikuma ............ G08B 13/1672 |
| 10,818,109 B2 | 10/2020 | Palmer |
| 2002/0035422 A1 | 3/2002 | Sasaki |
| 2002/0169530 A1 | 11/2002 | Laguer-Diaz |
| 2003/0081121 A1 | 5/2003 | Kirmuss |
| 2003/0081127 A1 | 5/2003 | Kirmuss |
| 2003/0222981 A1* | 12/2003 | Kisak ................... B61L 15/009 |
| | | 348/148 |
| 2004/0054444 A1 | 3/2004 | Abeska |
| 2004/0138794 A1 | 7/2004 | Saito |
| 2004/0193347 A1 | 9/2004 | Harumoto |
| 2004/0243308 A1 | 12/2004 | Irish |
| 2005/0185052 A1 | 8/2005 | Raisinghani |
| 2006/0047380 A1 | 3/2006 | Welch |
| 2007/0132773 A1 | 6/2007 | Plante |
| 2007/0135979 A1 | 6/2007 | Plante |
| 2008/0111666 A1 | 5/2008 | Plante |
| 2008/0147267 A1 | 6/2008 | Plante |
| 2010/0063672 A1 | 3/2010 | Anderson |
| 2010/0191411 A1 | 7/2010 | Cook |
| 2012/0083959 A1 | 4/2012 | Dolgov |
| 2012/0105635 A1 | 5/2012 | Erhardt |
| 2012/0188376 A1* | 7/2012 | Chatow ................ G08G 1/0129 |
| | | 340/936 |
| 2012/0253548 A1 | 10/2012 | Davidson |
| 2013/0208119 A1 | 8/2013 | Tseng |
| 2013/0325215 A1 | 12/2013 | Vos |
| 2014/0178031 A1 | 6/2014 | Walker |
| 2014/0266658 A1 | 9/2014 | Feldman |
| 2015/0035665 A1 | 2/2015 | Plante |
| 2015/0088335 A1 | 3/2015 | Lambert |
| 2015/0134226 A1 | 5/2015 | Palmer |
| 2015/0156439 A1 | 6/2015 | Neff |
| 2015/0316765 A1 | 11/2015 | Kim |
| 2016/0050396 A1* | 2/2016 | Gali ....................... H04N 7/181 |
| | | 348/159 |
| 2016/0140872 A1* | 5/2016 | Palmer ................ G09B 19/167 |
| | | 434/65 |
| 2016/0217325 A1 | 7/2016 | Bose |
| 2016/0280131 A1 | 9/2016 | Carson, Jr. |
| 2017/0113664 A1* | 4/2017 | Nix ......................... B60T 8/241 |
| 2017/0166217 A1 | 6/2017 | Sbianchi |
| 2017/0177287 A1* | 6/2017 | Jeong .................... H04N 7/181 |

OTHER PUBLICATIONS

ISR and Written Opinion for PCTIB2017052710 dated Aug. 11, 2017, 14 pages.
Seong, Machine Translation of KR-20150098039-A, Aug. 2015, Korean Patent Office Website http://kposd.kipo.go.kr:8088/up/kpion/ (Year: 2015).

* cited by examiner

SYSTEMS AND METHODS FOR CAPTURING AND OFFLOADING DIFFERENT INFORMATION BASED ON EVENT TRIGGER TYPE

FIELD

The systems and methods disclosed herein are related to detection of vehicle events, and, in particular, capturing and offloading event records for detected vehicle events from particular subsets of the sensors of a vehicle.

BACKGROUND

Systems configured to record, store, and transmit video, audio, and sensor data associated with a vehicle responsive to an accident involving the vehicle are known. Typically, such systems detect an accident based on data from a single sensor such as an accelerometer. Video from the accident may usually be analyzed by a user after the accident. Vehicle Engine Control Component (ECM) systems are known. Such systems interface/interoperate with external computers (e.g., at an automobile mechanic) where the data stored by the ECM system is analyzed.

SUMMARY

One aspect of the disclosure relates to a system configured to detect vehicle events. The system may be coupled and/or otherwise related to a vehicle. Some or all of the system may be installed in the vehicle and/or be otherwise coupled with the vehicle. The system may be configured to capture information based on vehicle events. The system may be configured to off-load and/or otherwise transmit captured information. In some implementations, the system may include sensors, one or more servers, one or more physical processors, electronic storage, one or more external providers, and/or other components. The sensors may be configured to generate output signals conveying information related to the vehicle and/or one or more current operating conditions of the vehicle. In some implementations, the system may detect vehicle events based on a comparison of the information conveyed by the output signals from the sensors to predetermined (variable and/or fixed) values, threshold, functions, and/or other information. Advantageously, the system may identify vehicle events in real-time or near real-time during operation of the vehicle. As used herein, the term "processor" is used interchangeably with the term "physical processor."

The sensors may be configured to generate output signals conveying information related to the operation and/or one or more operating conditions of the vehicle. Information related to the operation of the vehicle may include feedback information from one or more of the mechanical systems of the vehicle, and/or other information. In some implementations, at least one of the sensors may be a vehicle system sensor included in an engine control module (ECM) system or an electronic control module (ECM) system of the vehicle. In some implementations, one or more sensors may be carried by the vehicle. The sensors of a particular vehicle may be referred to as a set of sensors.

Individual sensors may be configured to generate output signals conveying information. The information may include visual information, motion-related information, position-related information, biometric information, and/or other information. In some implementations, the system may determine one or more parameters that are measured, derived, estimated, approximated, and/or otherwise determined based on one or more output signals generated by one or more sensors.

Sensors may include, by way of non-limiting example, one or more of an altimeter (e.g. a sonic altimeter, a radar altimeter, and/or other types of altimeters), a barometer, a magnetometer, a pressure sensor (e.g. a static pressure sensor, a dynamic pressure sensor, a pitot sensor, etc.), a thermometer, an accelerometer, a gyroscope, an inertial measurement sensor, global positioning system sensors, a tilt sensor, a motion sensor, a vibration sensor, an image sensor, a camera, an ultrasonic sensor, an infrared sensor, a light sensor, a microphone, an air speed sensor, a ground speed sensor, an altitude sensor, medical sensors (including but not limited to blood pressure sensor, pulse oximeter, heart rate sensor, etc.), degree-of-freedom sensors (e.g. 6-DOF and/or 9-DOF sensors), a compass, and/or other sensors. As used herein, the term "motion sensor" may include one or more sensors configured to generate output conveying information related to position, location, distance, motion, movement, acceleration, and/or other motion-based parameters. Output signals generated by individual sensors (and/or information based thereon) may be stored and/or transferred in electronic files.

Individual sensors may include image sensors, cameras, depth sensors, remote sensors, and/or other sensors. As used herein, the terms "camera" and/or "image sensor" may include any device that captures images, including but not limited to a single lens-based camera, a camera array, a solid-state camera, a mechanical camera, a digital camera, an image sensor, a depth sensor, a remote sensor, a lidar, an infrared sensor, a (monochrome) complementary metal-oxide-semiconductor (CMOS) sensor, an active pixel sensor, and/or other sensors. Individual sensors may be configured to capture information, including but not limited to visual information, video information, audio information, geolocation information, orientation and/or motion information, depth information, and/or other information. Information captured by one or more sensors may be marked, time-stamped, annotated, and/or otherwise processed such that information captured by other sensors can be synchronized, aligned, annotated, and/or otherwise associated therewith. For example, video information captured by an image sensor may be synchronized with information captured by an accelerometer or other sensor. Output signals generated by individual image sensors (and/or information based thereon) may be stored and/or transferred in electronic files.

In some implementations, an image sensor may be integrated with electronic storage such that captured information may be stored in the integrated embedded storage. In some implementations, the system may include one or more cameras. For example, a camera may include one or more image sensors and electronic storage media. In some implementations, an image sensor may be configured to transfer captured information to remote electronic storage media, e.g. through "the cloud."

The one or more servers may include one or more processors configured to execute one or more computer program components. The computer program components may include one or more of a parameter determination component, a context component, a detection component, a sensor selection component, a record component, a notification component, a location component, and/or other components.

The parameter determination component may be configured to determine current operating conditions and/or vehicle parameters. The parameter determination component may determine current operating conditions and/or vehicle parameters based on the information conveyed by the output signals from the sensors and/or other information. The one or more current operating conditions may be related to the vehicle, the operation of the vehicle, physical characteristics of the vehicle, and/or other information. In some implementations, the parameter determination component may be configured to determine one or more of the current operating conditions one or more times in an ongoing manner during operation of the vehicle. In some implementations, the parameter determination component may be configured to determine one or more of the parameters one or more times in an ongoing manner during operation of the vehicle.

The context component may be configured to obtain, receive, and/or determine contextual information related to environmental conditions near and/or around vehicles. Environmental conditions may be related to weather conditions, road surface conditions, traffic conditions, visibility, and/or other environmental conditions. In some implementations, one or more environmental conditions may be received from one or more sources external to the vehicle. For example, a source external to the vehicle may include a remote server and/or an external provider.

The detection component may be configured to detect vehicle events. Detection of vehicle events may be based on one or more current operating conditions of the vehicle. Detection of vehicle events may be based on one or more parameters of the vehicle. In some implementations, detection of a vehicle event includes determination of one or more event types for the detected vehicle event.

In some implementations, detection may be further based on one or more types of contextual information. In some implementations, detection may be accomplished and/or performed at the vehicle, e.g. by a physical processor that is carried by the vehicle.

The sensor selection component may be configured to select a subset of sensors. Selection may be based on and/or responsive to one or both of a detection of a vehicle event and one or more particular event types for a vehicle event. Selection of a subset may include one or more sensors from the set of sensors of a particular vehicle, and exclude one or more sensors from the set of sensors of a particular vehicle. In other words, a subset includes fewer sensors than the (entire or full) set of sensors of a vehicle.

The record component may be configured to capture, record, store, and/or transmit information, including but not limited to information related to vehicle events. In some implementations, information related to vehicle events may be used to create vehicle event records. Vehicle event records may include video information, audio information, data from an ECM system, metadata, information based on sensor-generated output, and/or other information. In some implementations, the record component may be configured to capture, record, store, and/or transmit information from a subset of sensors. For example, the subset of sensors may be selected by the sensor selection component.

Vehicle event records may be stored locally in a vehicle and/or transmitted from a vehicle to a system, server, and/or a service that is external to the vehicle, including but not limited to a remote server and/or an external provider. In some implementations, a system, server, and/or a service that is external to the vehicle may query and/or request information from a particular vehicle. The record component may be configured to respond to a query or request by transmitting information as queried and/or requested. In some implementations, the record component may be configured to facilitate communication of information between vehicles, remote servers, external providers, and/or other systems, servers, and/or services external to vehicles. Communication may be in real-time or near real-time. Communication may be wireless.

The notification component may be configured to generate and/or determine notifications related to vehicle events. In some implementations, notifications may be intended for drivers of vehicles. For example, the notification component may be configured to provide notifications to drivers, including but not limited to warnings or requests (for example to reduce speed). In some implementations, notifications may be transmitted from a vehicle to a system, server, and/or a service that is external to the vehicle, including but not limited to a remote server and/or an external provider.

The location component may be configured to obtain and/or determine information related to the locations of vehicles and/or other locations (which may be referred to as location information). In some implementations, the location component may be configured to receive information related to the current location of a vehicle. By way of non-limiting example, location information may include global positioning system (GPS) information.

As used herein, any association (or relation, or reflection, or indication, or correspondency) involving vehicles, sensors, vehicle events, operating conditions, parameters, thresholds, functions, notifications, and/or another entity or object that interacts with any part of the system and/or plays a part in the operation of the system, may be a one-to-one association, a one-to-many association, a many-to-one association, and/or a many-to-many association or N-to-M association (note that N and M may be different numbers greater than 1).

As used herein, the term "obtain" (and derivatives thereof) may include active and/or passive retrieval, determination, derivation, transfer, upload, download, submission, and/or exchange of information, and/or any combination thereof. As used herein, the term "effectuate" (and derivatives thereof) may include active and/or passive causation of any effect. As used herein, the term "determine" (and derivatives thereof) may include measure, calculate, compute, estimate, approximate, generate, and/or otherwise derive, and/or any combination thereof.

These and other objects, features, and characteristics of the servers, systems, and/or methods disclosed herein, as well as the methods of operation and functions of the related elements of structure and the combination of parts and economies of manufacture, will become more apparent upon consideration of the following description and the appended claims with reference to the accompanying drawings, all of which form a part of this disclosure, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Figure 1:
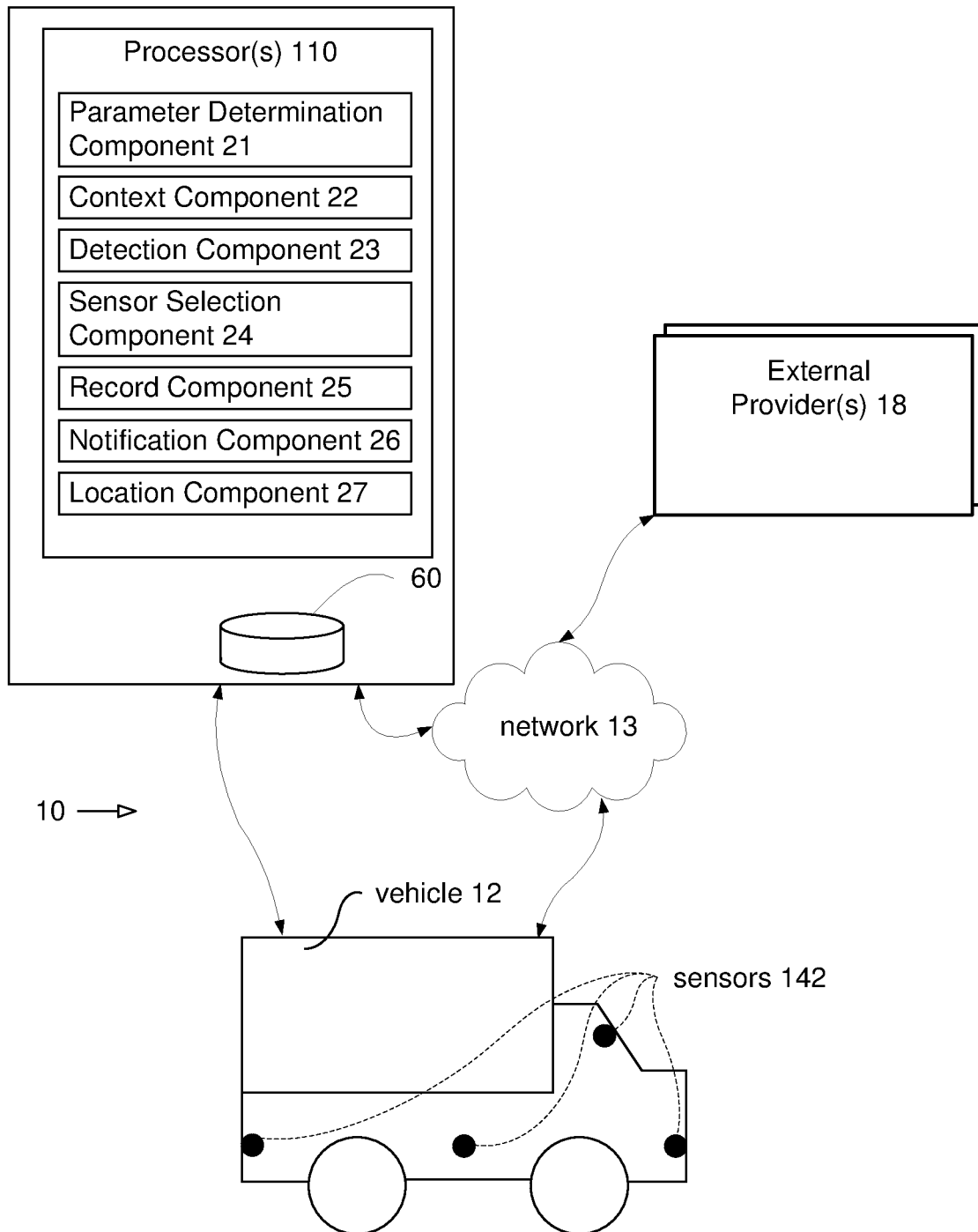
FIG. 1 illustrates a system configured to capture information based on detected vehicle events, in accordance with one or more embodiments.

FIG. 1 illustrates a system 10 configured to detect vehicle events of a vehicle 12. Some or all of system 10 may be installed in vehicle 12, carried by vehicle 12, and/or be otherwise coupled with and/or related to vehicle 12. In some implementations, system 10 may include sensors 142, one or more servers 11, one or more physical processors 110, electronic storage 60, a network 13, one or more external providers 18, and/or other components. One or more sensors 142 may be configured to generate output signals. The output signals may convey information related to vehicle 12, parameters of vehicle 12, and/or current operating conditions of vehicle 12.

Information related to current operating conditions of the vehicle may include feedback information from one or more of the mechanical systems of vehicle 12, and/or other information. The mechanical systems of vehicle 12 may include, for example, the engine, the drive train, the lighting systems (e.g., headlights, brake lights), the braking system, the transmission, fuel delivery systems, and/or other mechanical systems. The mechanical systems of vehicle 12 may include one or more mechanical sensors, electronic sensors, and/or other sensors that generate the output signals (e.g., seat belt sensors, tire pressure sensors, etc.). In some implementations, at least one of sensors 142 may be a vehicle system sensor included in an ECM system of vehicle 12.

In some implementations, sensors 142 may include one or more video cameras, one or more image sensors, and/or one or more microphones, and/or other sensors. Based on an analysis of images and/or sounds captured, system 10 may determine, using algorithms, that vehicle 12 is moving forward, is in reverse, has maneuvered outside of its lane of traffic, is making a turn, and/or other maneuvers. For example, by way of non-limiting example, driving maneuvers may include swerving, a U-turn, freewheeling, over-revving, lane-departure, short following distance, imminent collision, unsafe turning that approaches rollover and/or vehicle stability limits, hard braking, rapid acceleration, idling, driving outside a geo-fence boundary, crossing double-yellow lines, passing on single-lane roads, a certain number of lane changes within a certain amount of time or distance, fast lane change, cutting off other vehicles during lane-change speeding, running a red light, running a stop sign, and/or other driving maneuvers.

In some implementations, information related to current operating conditions of vehicle 12 may include information related to the environment in and/or around vehicle 12. The vehicle environment may include spaces in and around an interior and an exterior of vehicle 12. The information may include information related to movement of vehicle 12, an orientation of vehicle 12, a geographic position of vehicle 12, a spatial position of vehicle 12 relative to other objects, a tilt angle of vehicle 12, an inclination/declination angle of vehicle 12, and/or other information. In some implementations, the output signals conveying information may be generated via non-standard aftermarket sensors installed in vehicle 12. Non-standard aftermarket sensors may include, for example, a video camera, a microphone, an accelerometer, a gyroscope, a geolocation sensor (e.g., a GPS device), a radar detector, a magnetometer, radar (e.g. for measuring distance of leading vehicle), and/or other sensors. In some implementations, sensors 142 may include multiple cameras positioned around vehicle 12 and synchronized together to provide a 360 degree view of the inside of vehicle 12 and/or a 360 degree view of the outside of vehicle 12.

Although sensors 142 are depicted in FIG. 1 as four elements, this is not intended to be limiting. Sensors 142 may include one or more sensors located adjacent to and/or in communication with the various mechanical systems of vehicle 12, in one or more positions (e.g., at or near the front of vehicle 12, at or near the back of vehicle 12, on the side of vehicle 12, on or near the windshield of vehicle 12, facing outward and/or inward, etc.) to accurately acquire information representing the vehicle environment (e.g. visual information, spatial information, orientation information), and/or in other locations. For example, in some implementations, system 10 may be configured such that a first sensor is located near or in communication with a rotating tire of vehicle 12, and a second sensor located on top of vehicle 12 is in communication with a geolocation satellite. In some implementations, sensors 142 may be configured to generate output signals continuously during operation of vehicle 12.

As shown in FIG. 1, server 11 may include one or more processors 110 configured to execute one or more computer program components. The computer program components may comprise one or more of a parameter determination component 21, a context component 22, a detection component 23, a sensor selection component 24, a record component 25, a notification component 26, a location component 27, and/or other components.

Parameter determination component 21 may be configured to determine current operating conditions and/or vehicle parameters of vehicles, e.g. vehicle 12. Parameter determination component 21 may determine current operating conditions and/or vehicle parameters based on the information conveyed by the output signals from sensors 142 and/or other information. The one or more current operating conditions may be related to vehicle 12, the operation of vehicle 12, physical characteristics of vehicle 12, and/or other information. In some implementations, parameter determination component 21 may be configured to determine one or more of the current operating conditions and/or the vehicle parameters one or more times in an ongoing manner during operation of vehicle 12.

In some implementations, operating conditions may include vehicle parameters. For example, vehicle parameters may be related to one or more of an acceleration, a direction of travel, a turn diameter, a vehicle speed, an engine speed (e.g. RPM), a duration of time, a closing distance, a lane departure from an intended travelling lane of the vehicle, a following distance, physical characteristics of vehicle 12 (such as mass and/or number of axles, for example), a tilt angle of vehicle 12, an inclination/declination angle of vehicle 12, and/or other parameters.

The physical characteristics of vehicle 12 may be physical features of vehicle 12 set during manufacture of vehicle 12, during loading of vehicle 12, and/or at other times. For example, the one or more vehicle parameters may include a vehicle type (e.g., a car, a bus, a semi-truck, a tanker truck), a vehicle size (e.g., length), a vehicle weight (e.g., including cargo and/or without cargo), a number of gears, a number of axles, a type of load carried by vehicle 12 (e.g., food items, livestock, construction materials, hazardous materials, an oversized load, a liquid), vehicle trailer type, trailer length, trailer weight, trailer height, a number of axles, and/or other physical features.

In some implementations, parameter determination component 21 may be configured to determine one or more vehicle parameters based on the output signals from at least two different sensors. For example, parameter determination component 21 may determine one or more of the vehicle parameters based on output signals from a sensor 142 related to the ECM system and an external aftermarket added sensor 142. In some implementations, a determination of one or more of the vehicle parameters based on output signals from at least two different sensors 142 may be more accurate and/or precise than a determination based on the output signals from only one sensor 142. For example, on an icy surface, output signals from an accelerometer may not convey that a driver of vehicle 12 is applying the brakes of vehicle 12. However, a sensor in communication with the braking system of vehicle 12 would convey that the driver is applying the brakes. System 10 may determine a value of a braking parameter based on the braking sensor information even though the output signals from the accelerometer may not convey that the driver is applying the brakes.

Parameter determination component 21 may be configured to determine vehicle parameters that are not directly measurable by any of the available sensors. For example, an inclinometer may not be available to measure the road grade, but vehicle speed data as measured by a GPS system and/or by a wheel sensor ECM may be combined with accelerometer data to determine the road grade. If an accelerometer measures a force that is consistent with braking, but the vehicle speed remains constant, the parameter component can determine that the measured force is a component of the gravity vector that is acting along the longitudinal axis of the vehicle. By using trigonometry, the magnitude of the gravity vector component can be used to determine the road grade (e.g., pitch angle of the vehicle in respect to the horizontal plane).

In some implementations, one or more of the vehicle parameters may be determined one or more times in an ongoing manner during operation of vehicle 12. In some implementations, one or more of the vehicle parameters may be determined at regular time intervals during operation of vehicle 12. The timing of the vehicle parameter determinations (e.g., in an ongoing manner, at regular time intervals, etc.) may be programmed at manufacture, obtained responsive to user entry and/or selection of timing information via a user interface and/or a remote computing device, and/or may be determined in other ways. The time intervals of parameter determination may be significantly less (e.g. more frequent) than the time intervals at which various sensor measurements are available. In such cases, system 10 may estimate vehicle parameters in between the actual measurements of the same vehicle parameters by the respective sensors, to the extent that the vehicle parameters are measurable. This may be established by means of a physical model that describes the behavior of various vehicle parameters and their interdependency. For example, a vehicle speed parameter may be estimated at a rate of 20 times per second, although the underlying speed measurements are much less frequent (e.g., four times per second for ECM speed, one time per second for GPS speed). This may be accomplished by integrating vehicle acceleration, as measured by the accelerometer sensor where the measurements are available 1000 times per second, across time to determine change in speed that is accumulated over time again for the most recent vehicle speed measurement. The benefit of these more frequent estimates of vehicle parameters are many and they include improved operation of other components of system 10, reduced complexity of downstream logic and system design (e.g., all vehicle parameters are updated at the same interval, rather than being updating irregularly and at the interval of each respective sensor), and more pleasing (e.g., "smooth") presentation of vehicle event recorder data through an event player apparatus.

In some implementations, system 10 may be configured to detect specific driving maneuvers based on one or more of a vehicle speed, an engine load, a throttle level, an accelerator position, vehicle direction, a gravitational force, and/or other parameters being sustained at or above threshold levels for pre-determined amounts of time. In some implementations, an acceleration and/or force threshold may be scaled based on a length of time an acceleration and/or force is maintained, and/or the particular speed the vehicle is travelling. System 10 may be configured such that force maintained over a period of time at a particular vehicle speed may decrease a threshold force the longer that the force is maintained. System 10 may be configured such that, combined with engine load data, throttle data may be used to determine a risky event, a fuel wasting event, and/or other events.

Context component 22 may be configured to obtain, receive, and/or determine contextual information related to environmental conditions near and/or around vehicles. Environmental conditions may be related to weather conditions, road surface conditions, traffic conditions, visibility, and/or other environmental conditions. In some implementations, environmental conditions may be related to proximity of certain objects that are relevant to driving, including but not limited to traffic signs, railroad crossings, time of day, ambient light conditions, altitude, and/or other objects relevant to driving. In some implementations, one or more environmental conditions may be received from one or more sources external to vehicle 12. For example, a source external to vehicle 12 may include a remote server and/or an external provider 18. In some implementations, contextual information may include a likelihood of traffic congestion near a particular vehicle, and/or near a particular location. In some implementations, contextual information may include a likelihood of the road surface near a particular vehicle and/or a particular location being icy, wet, and/or otherwise potentially having an effect of braking. In some implementations, environmental conditions may include information related to a particular driver and/or a particular trip. For example, with every passing hour that a particular driver drives his vehicle during a particular trip, the likelihood of drowsiness may increase. In some implementations, the function between trip duration or distance and likelihood of drowsiness may be driver-specific.

In some implementations, contextual information may be received by system 10 through network 13, e.g. the internet. Network 13 may include private networks, public networks, and/or combinations thereof. For example, contextual information related to weather conditions may be received from a particular external provider 18 that provides weather information. For example, contextual information related to road surface conditions may be received from a particular external provider 18 that provides road condition information. For example, contextual information related to traffic conditions may be received from a particular external provider 18 that provides traffic information.

Detection component 23 may be configured to detect vehicle events. Detection of vehicle events may be based on one or more current operating conditions of vehicle 12. Alternatively, and/or simultaneously, detection of vehicle events may be based on one or more vehicle parameters of vehicle 12. In some implementations, detection of a vehicle event may include determination of one or more event types for the detected vehicle event. For example, some vehicle events may be related to proximity of vehicle 12 to some object in front of vehicle 12. For example, some event types may be related to proximity of vehicle 12 to some object in front of vehicle 12. For example, some vehicle events may be related to proximity of vehicle 12 to some object behind vehicle 12. For example, some event types may be related to proximity of vehicle 12 to some object behind vehicle 12. For example, some vehicle events may be related to proximity of vehicle 12 to some object to a particular side of vehicle 12 (e.g., the loading side, the revenue side, and/or other sides). For example, some event types may be related to proximity of vehicle 12 to some object to a particular side of vehicle 12 (e.g., the loading side, the revenue side, and/or other sides). For example, some vehicle events may be related to the speed of vehicle 12 being less than some predetermined speed threshold. For example, some event types may be related to the speed of vehicle 12 being less than some predetermined speed threshold. For example, some vehicle events may be related to the speed of vehicle 12 being more than some predetermined speed threshold. For example, some event types may be related to the speed of vehicle 12 being more than some predetermined speed threshold. For example, some vehicle events may be categorized as having a particular event type based on a particular driving maneuver that vehicle 12 is performing. For example, one or more event types may be related to driving backwards, parking a vehicle, driving in a parking lot or garage, being stalled at a traffic light, loading and/or unloading from the vehicle, performing some operation involving the vehicle (e.g., transferring gasoline from a tanker truck), and/or other events related to a vehicle.

In some implementations, detection of vehicle events and/or determination of event types may be further based on one or more types of contextual information. In some implementations, detection and/or determination may be accomplished and/or performed at vehicle 12, e.g. by processor 110 that is carried by vehicle 12. Alternatively, and/or simultaneously, in some implementations, detection and/or determination may be accomplished and/or performed remote from vehicle 12, e.g. by processor 110 that is not carried by vehicle 12. Vehicle events may include speeding, unsafe driving speed, collisions, near-collisions, and/or other events. In some implementations, vehicle events may include the distance between two vehicles being dangerously small, which may for example indicate an increased likelihood of a collision. In some implementations, vehicle events may include one or more driving maneuvers, e.g. in a particular predefined sequence.

In some implementations, a value of a current operating condition that effectuates detection of a vehicle event and/or determination of an event type may vary as a function of the contextual information. For example, a speed of 50 mph (in a particular geographical location) may not effectuate detection of a vehicle event and/or determination of an event type when the road surface is dry and/or when traffic is light, but the same speed in the same geographical location may effectuate detection of a vehicle event and/or determination of an event type responsive to contextual information and/or other information indicating that the road surface is wet and/or icy (and/or may be wet and/or icy), or responsive to contextual information (and/or other information) that traffic is heavy (and/or may be heavy). In this example, the contextual information (and/or other information) may have an effect of the detection of vehicle events and/or the determination of event types. In some implementations, contextual information (and/or other information) may modify the sensitivity of the process and/or mechanism by which vehicle events are detected and/or event types are determined.

For example, a particular vehicle 12 operates at a particular operating condition (as determined based on output signals generated by a particular sensor 142). In light of a particular current environmental condition at a first moment (e.g. sunny weather and/or light traffic), the particular operating condition may provide an insufficient impetus to determine and/or detect a particular vehicle event (e.g. "unsafe driving speed"). Subsequently, at a second moment after the first moment, a different environmental condition (e.g. rain, snow, and/or heavy traffic) becomes operative (e.g., the different environmental condition may be received at particular vehicle 12 as contextual information and/or other information). In light of the different environmental condition, the combination of the different environmental condition and the particular operating condition may provide a sufficient impetus to determine and/or detect a particular vehicle event.

In some implementations, detection of vehicle events and/or determination of event types may be based on one or more comparisons of the values of current operating conditions with threshold values. In some implementations, a particular threshold value may vary as a function of contextual information. In some implementations, a particular threshold value may vary as a function of other information, e.g. as determined based on sensor output.

By way of non-limiting example, lateral forces of about −0.3 g (e.g., swerve left) and/or about +0.3 g (e.g., swerve right) may be a basis used to detect a swerve. In some implementations, the −0.3 g and/or +0.3 g criteria may be used at vehicle 12 speeds less than about 10 kph. The −0.3 g and/or +0.3 g criteria may be scaled as vehicle 12 increases in speed. In some implementations, the −0.3 g and/or +0.3 g criteria may be scaled (e.g., reduced) by about 0.0045 g per kph of speed over 10 kph. To prevent too much sensitivity, system 10 may limit the lateral force criteria to about +/−0.12 g, regardless of the speed of vehicle 12, for example. In some implementations, the criterion for the given period of time between swerves may be about 3 seconds.

Sensor selection component 24 may be configured to select a subset of sensors. Selection may be based on and/or responsive to one or both of a detection of a vehicle event and/or one or more particular event types for a vehicle event. Selection of a subset may mean including one or more sensors from the set of sensors 142 of a particular vehicle, and excluding one or more sensors from the set of sensors of a particular vehicle. In other words, a subset may include fewer sensors than the (entire or full) set of sensors 142 of a vehicle. In some implementations, a particular vehicle event may be associated with a particular subset of sensors. In some implementations, a particular event type may be associated with a particular subset of sensors. For example, an event type related to driving backwards may be associated with, at least, backward-facing video cameras. For example, an event type related to a swerve may be associated with, at least, sideways-facing video cameras.

Record component 25 may be configured to capture, record, store, transmit, and/or process information, including but not limited to information related to vehicle events. In some implementations, information related to vehicle events may be used to generate and/or create vehicle event records. Vehicle event records may include video information, audio information, data from an ECM system, metadata, timing information, information based on sensor-generated output, and/or other information. In some implementations, the capacity to generate and/or capture new information may exceed the capacity to record, store, transmit, and/or process that information. In particular, video cameras may generate a large amount of data. In implementations having multiple video cameras per vehicle, record component 25 may be configured to process information from fewer than the full set of sensors of vehicle 12. For example, record component 25 may process information from a subset of sensors 142 of vehicle 12, e.g. as selected by sensor selection component 24.

Vehicle event records may be generated and/or stored locally in vehicle 12 and/or transmitted from vehicle 12 to system 10, server 11, and/or to a service that is external to the vehicle, including but not limited to a remote server and/or external provider 18. In some implementations, vehicle event records may be generated and/or stored remotely, i.e. not locally at vehicle 12. In some implementations, system 10, server 11, and/or a service that is external to vehicle 12 may query and/or request information from a particular vehicle 12. Record component 25 may be configured to respond to a query or request by transmitting information as queried and/or requested. In some implementations, record component 25 may be configured to facilitate communication of information between particular vehicles, remote servers, external providers, and/or other systems, servers, and/or services external to the particular vehicles. Such communication may be in real-time or near real-time. Such communication may include wireless communication.

In some implementations, system 10 may be configured to detect multiple different vehicle events, e.g. at different points in time. The multiple vehicle events may include a first vehicle event, second vehicle event, third vehicle event, and/or additional vehicle events. Responsive to detection of the first vehicle event, system 10 may be configured to select a first subset of sensors 142, capture information based on the first subset of sensors 142, and generate a first event record that includes and/or is based on the captured information. Responsive to detection of the second vehicle event, system 10 may be configured to select a second subset of sensors 142 that is different than the first subset of sensors, capture information based on the second subset of sensors 142, and generate a second event record that includes and/or is based on the captured information. At least one sensor in the first subset of sensor may have a different field-of-view (of an environment in and/or around vehicle 12) than any of the sensors in the second subset of sensors. Responsive to detection of the third vehicle event, system 10 may be configured to select a third subset of sensors 142 that is different than the first and second subsets of sensors, capture information based on the third subset of sensors 142, and generate a third event record that includes and/or is based on the captured information. At least one sensor in the third subset of sensor may have a different field-of-view (of an environment in and/or around vehicle 12) than any of the sensors in the first and second subsets of sensors.

In some implementations, the second subset of sensors may exclude at least one sensor that is included in the first subset of sensors. In some implementations, the third subset of sensors may exclude at least one sensor that is included in either the first or second subset of sensors.

Figure 3:
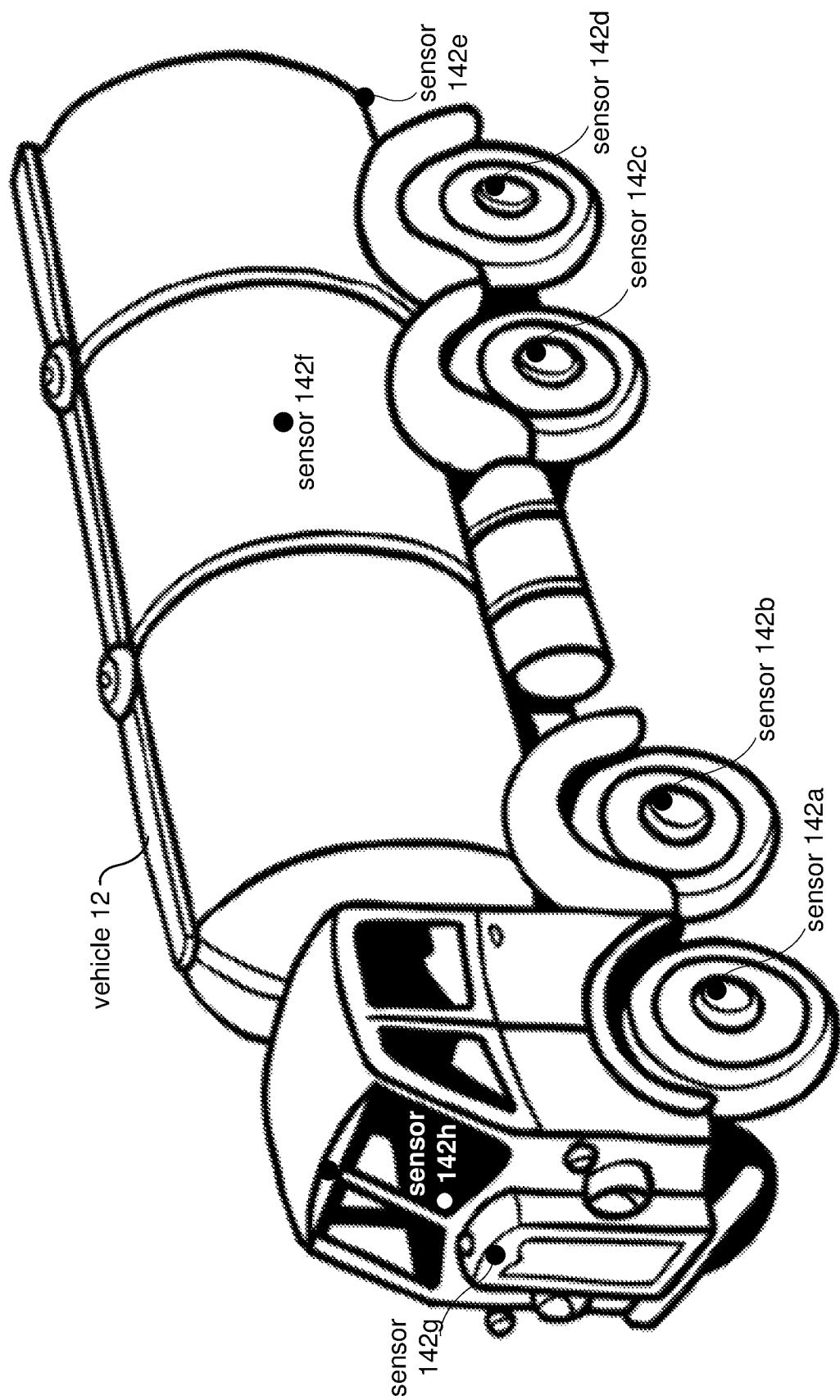
FIG. 3 illustrates an exemplary vehicle that includes multiple sensors.

By way of non-limiting example, FIG. 3 illustrates an exemplary vehicle 12 that includes multiple sensors, labeled 142a-142h. For example, sensors 142a, 142b, 142c, and 142d may include wheel sensors. For example, sensor 142e may include a rear-facing camera. For example, sensor 142f may include a side-facing camera. For example, sensor 142g may include a forward facing-camera. For example, sensor 142h may include an inward-facing camera. In some implementations, a first subset of sensors may include forward-facing camera 142g but exclude rear-facing camera 142e. In some implementations, a second subset of sensors may exclude forward-facing camera 142g but include rear-facing camera 142e. In some implementations, a third subset of sensors may include side-facing camera 142f and/or inward-facing camera 142h, but exclude one or both of forward-facing camera 142g and rear-facing camera 142e. These examples are not intended to be limiting in any way.

Notification component 26 may be configured to generate and/or determine notifications related to vehicle events. In some implementations, notifications may be intended for drivers of vehicles. For example, notification component 26 may be configured to provide notifications to drivers, including but not limited to warnings or requests (for example to reduce speed). In some implementations, notifications may be transmitted from vehicle 12 to system 10, server 11, and/or a service that is external to vehicle 12, including but not limited to a remote server and/or external provider 18. For example, a notification that a collision has occurred may be transmitted to a remote server and/or external provider 18. In some implementations, notifications may be stored locally, in electronic storage of a particular vehicle 12. Stored notifications may be retrieved later, e.g. after the particular vehicle 12 has returned to fleet headquarters, or subsequent to the particular vehicle 12 entering a particular geographical area (e.g. within range of wireless communication with a particular external provider 18).

Location component 27 may be configured to obtain and/or determine information related to the locations of vehicles and/or other locations (which may be referred to as location information). In some implementations, location component 27 may be configured to receive information related to the current location of vehicle 12. By way of non-limiting example, location information may include global positioning system (GPS) information. Operation by other components of system 10 may be based, at least in part, on information obtained and/or determined by location component 27. For example, detection of vehicle events may be affected based on proximity and/or orientation to objects near vehicle 12, geo-fence around vehicle 12, and/or other conditions related to vehicle 12.

In some implementations, system 10 may include a user interface configured to provide an interface between system 10 and users through which the users may provide information to and receive information from system 10. This enables information to be communicated between a user and one or more of processor 110, sensors 142, vehicle 12, and/or other components of system 10. As an example, a dangerous driving maneuver and/or vehicle event may be displayed to the driver of vehicle 12 via the user interface, e.g. as a notification.

Examples of interface devices suitable for inclusion in a user interface include a keypad, buttons, switches, a keyboard, knobs, levers, a display screen, a touch screen, speakers, a microphone, an indicator light, an audible alarm, a printer, a tactile feedback device, and/or other interface devices.

It is to be understood that other communication techniques, either hard-wired or wireless, are also contemplated by the present disclosure as a user interface. Information may be loaded into system 10 wirelessly from a remote location, from removable storage (e.g., a smart card, a flash drive, a removable disk, etc.), and/or other sources that enable the user(s) to customize the implementation of system 10. Other exemplary input devices and techniques adapted for use with system 10 include, but are not limited to, an RS-232 port, RF link, an IR link, modem (telephone, cable, and/or other modems), a cellular network, a Wi-Fi network, a local area network, and/or other devices and/or systems. In short, any technique for communicating information with system 10 is contemplated by the present disclosure as a user interface.

Electronic storage 60 may comprise electronic storage media that electronically stores information. The electronic storage media of electronic storage 60 may comprise one or both of system storage that is provided integrally (i.e., substantially non-removable) with system 10 and/or removable storage that is removably connectable to system 10 via, for example, a port (e.g., a USB port, a firewire port, etc.) or a drive (e.g., a disk drive, etc.). Electronic storage 60 may comprise one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 60 may store software algorithms, recorded video event data, information determined by processor 110, information received via a user interface, and/or other information that enables system 10 to function properly. Electronic storage 60 may be (in whole or in part) a separate component within system 10, or electronic storage 60 may be provided (in whole or in part) integrally with one or more other components of system 10.

In some implementations, a remote server may include communication lines, or ports to enable the exchange of information with a network, processor 110 of system 10, and/or other computing platforms. The remote server may include a plurality of processors, electronic storage, hardware, software, and/or firmware components operating together to provide the functionality attributed herein to a remote device. For example, the server may be implemented by a cloud of computing platforms operating together as a system server.

As described above, processor 110 may be configured to provide information-processing capabilities in system 10. As such, processor 110 may comprise one or more of a digital processor, an analog processor, a digital circuit designed to process information, an analog circuit designed to process information, a state machine, and/or other mechanisms for electronically processing information. Although processor 110 is shown in FIG. 1 as a single entity, this is for illustrative purposes only. In some implementations, processor 110 may comprise a plurality of processing units. These processing units may be physically located within the same device (e.g., a vehicle event recorder), or processor 110 may represent processing functionality of a plurality of devices operating in coordination.

Processor 110 may be configured to execute components 21-27 by software; hardware; firmware; some combination of software, hardware, and/or firmware; and/or other mechanisms for configuring processing capabilities on processor 110. It should be appreciated that although components 21-27 are illustrated in FIG. 1 as being co-located within a single processing unit, in implementations in which processor 110 comprises multiple processing units, one or more of components 21-27 may be located remotely from the other components. The description of the functionality provided by the different components 21-27 described herein is for illustrative purposes, and is not intended to be limiting, as any of components 21-27 may provide more or less functionality than is described. For example, one or more of components 21-27 may be eliminated, and some or all of its functionality may be provided by other components 21-27. As another example, processor 110 may be configured to execute one or more additional components that may perform some or all of the functionality attributed below to one of components 21-27.

Figure 2:
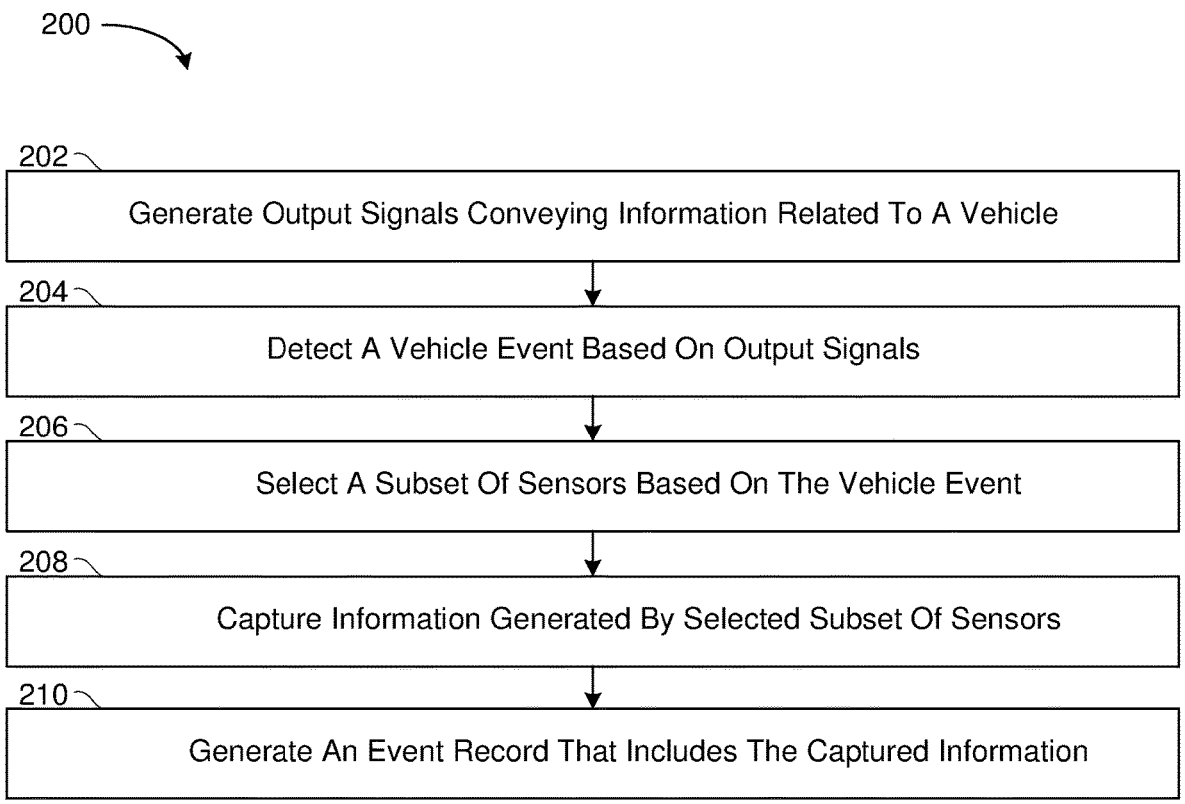
FIG. 2 illustrates a method to capture information based on detected vehicle events, in accordance with one or more embodiments.

FIG. 2 illustrates a method 200 to capture information based on detected vehicle events. The operations of method 200 presented below are intended to be illustrative. In some implementations, method 200 may be accomplished with one or more additional operations not described, and/or without one or more of the operations discussed. Additionally, the order in which the operations of method 200 are illustrated (in FIG. 2) and described below is not intended to be limiting. In some implementations, two or more of the operations may occur substantially simultaneously.

In some implementations, method 200 may be implemented in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at an operation 202, output signals are generated that convey information related to one or more current operating conditions of the vehicle. In some embodiments, operation 202 is performed by sensors the same as or similar to sensors 142 (shown in FIG. 1 and described herein). The set of sensors is carried by the vehicle.

At an operation 204, vehicle events are detected based on the generated output signals. Detection of the vehicle events includes determination of event type for the individual vehicle events. In some embodiments, operation 204 is performed by a detection component the same as or similar to detection component 23 (shown in FIG. 1 and described herein).

At an operation 206, responsive to detection of a first vehicle event of a first event type, and based on the first event type, a first subset of sensors is selected. The first subset of sensors excludes at least one of the sensors from the set of sensors. In some embodiments, operation 206 is performed by a sensor selection component the same as or similar to sensor selection component 24 (shown in FIG. 1 and described herein).

At an operation 208, information is captured that is conveyed by the output signals that are generated by the first subset of sensors proximate in time to the first vehicle event. In some embodiments, operation 208 is performed by a record component the same as or similar to record component 25 (shown in FIG. 1 and described herein).

At an operation 210, a first event record is generated that is associated with the first vehicle event. The first event record includes the captured information. In some embodiments, operation 210 is performed by a record component the same as or similar to record component 25 (shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system configured to capture information based on detected vehicle events, the system configured to couple with a vehicle having a front, a rear, and a side, the system comprising:
   a set of sensors configured to generate output signals conveying information related to current operating conditions of the vehicle, wherein the set of sensors is carried by the vehicle;
   a set of cameras configured to capture image data, wherein the set of cameras is carried by the vehicle, wherein the set of cameras includes a first camera configured to capture first image data, a second camera configured to capture second image data, and a third camera configured to capture third image data; and
   one or more processors configured to:
      detect vehicle events while the vehicle is in motion, wherein detection of the vehicle events is based on the generated output signals, wherein the detected vehicle events include a first vehicle event, a second vehicle event, and a third vehicle event;
      determine a first event type for the first vehicle event, wherein the first event type is related to the front of the vehicle, a second event type for the second vehicle event, wherein the second event type is related to the rear of the vehicle, a third event type for the third vehicle event, wherein the third event type is related to the side of the vehicle, and wherein the first, second, and third event types are different event types;
      responsive to detection of the first vehicle event, and based on the first event type, select a first subset of cameras from the set of cameras, wherein the first subset of cameras includes the first camera and excludes at least one of the second and third cameras;
      responsive to detection of the second vehicle event, and based on the second event type, select a second subset of cameras from the set of cameras, wherein the second subset of cameras includes the second camera and excludes at least one of the first and third cameras;
      responsive to detection of the third vehicle event, and based on the third event type, select a third subset of cameras from the set of cameras, wherein the third subset of cameras includes the third camera and excludes at least one of the first and second cameras;
      generate a first event record associated with the first vehicle event, wherein the first event record includes captured image data for the first subset of cameras, including the captured first image data;
      generate a second event record associated with the second vehicle event, wherein the second event record includes captured image data for the second subset of cameras, including the captured second image data;
      generate a third event record associated with the third vehicle event, wherein the third event record includes captured image data for the third subset of cameras, including the captured third image data; and
      transmit the first, second, and third event records from the vehicle to a remote server that is external to the vehicle.

2. The system of claim 1, wherein the set of sensors includes a depth sensor configured to generate output signals conveying depth information, the depth information including ranges of surfaces and/or objects within an environment in and/or around the vehicle, the environment around the vehicle including an area within a first field-of-view of the first camera and/or a second field-of-view of the second camera, wherein the first vehicle event is related to a distance between two vehicles, wherein detection of the first vehicle event is based on the depth information.

3. The system of claim 1, wherein detection of the first vehicle event is based on a comparison of a vehicle speed of the vehicle with a threshold value.

4. The system of claim 1, wherein a current operating condition of the vehicle includes one or more of an engine load, a throttle level, a particular change in vehicle direction, or multiple changes in vehicle direction.

5. The system of claim 1, wherein the first vehicle event is related to unsafe vehicle speed.

6. The system of claim 1, wherein the first vehicle event is an imminent collision, wherein the third vehicle event is a swerve, wherein the first camera is a forward-facing camera, wherein the third camera is a sideways-facing camera, wherein the first subset of cameras excludes the sideways-facing camera, and wherein the third subset of cameras includes the sideways-facing camera.

7. The system of claim 1, wherein the first event type corresponds to vehicle events occurring at a particular speed of the vehicle, wherein the particular speed of the vehicle is less than a speed threshold, and wherein the first vehicle event occurred at a speed less than the speed threshold.

8. The system of claim 1, wherein the vehicle events include one or more of swerving, a U-turn, freewheeling, over-revving, lane-departure, short following distance, imminent collision, unsafe turning that approaches rollover, hard braking, rapid acceleration, idling, driving outside a geo-fence boundary, crossing double-yellow lines, passing on single-lane roads, a certain number of lane changes within a certain amount of time or distance, fast lane change, cutting off other vehicles during lane-change, speeding, running a red light, and/or running a stop sign.

9. A method to capture information based on detected vehicle events of a vehicle having a front, a rear, and a side, the method comprising:
   generating, by a set of sensors, output signals conveying information related to current operating conditions of the vehicle, wherein the set of sensors is carried by the vehicle;
   capturing, by a set of cameras, image data, wherein the set of cameras includes a first camera that captures first image data, a second camera that captures second image data, and a third camera that captures third image data;
   detecting vehicle events while the vehicle is in motion, wherein detection of the vehicle events is based on the output signals, wherein the detected vehicle events include a first vehicle event, a second vehicle event, and a third vehicle event;
   determining a first event type for the first vehicle event, wherein the first event type is related to the front of the vehicle, a second event type for the second vehicle event, wherein the second event type is related to the rear of the vehicle, a third event type for the third vehicle event, wherein the third event type is related to the side of the vehicle, and wherein the first, second, and third event types are different event types;

responsive to detection of the first vehicle event, and based on the first event type, selecting a first subset of cameras from the set of cameras, wherein the first subset of cameras includes the first camera and excludes at least one of the second and third cameras;

responsive to detection of the second vehicle event, and based on the second event type, selecting a second subset of cameras from the set of cameras, wherein the second subset of cameras includes the second camera and excludes at least one of the first and third cameras;

responsive to detection of the third vehicle event, and based on the third event type, selecting a third subset of cameras from the set of cameras, wherein the third subset of cameras includes the third camera and excludes at least one of the first and second cameras;

generating a first event record associated with the first vehicle event, wherein the first event record includes captured image data for the first subset of cameras, including the captured first image data;

generating a second event record associated with the second vehicle event, wherein the second event record includes captured image data for the second subset of cameras, including the captured second image data;

generating a third event record associated with the third vehicle event, wherein the third event record includes captured image data for the third subset of cameras, including the captured third image data;

and transmitting the first, second, and third event records from the vehicle to a remote server that is external to the vehicle.

10. The method of claim 9, wherein the set of sensors includes a depth sensor configured to generate depth-related output signals conveying depth information, the depth information including ranges of surfaces and/or objects within an environment in and/or around the vehicle, the environment around the vehicle including an area within a first field-of-view of the first camera and/or a second field-of-view of the second camera, wherein the first vehicle event is related to a distance between two vehicles, wherein detection of the first vehicle event is based on the depth information.

11. The method of claim 9, wherein detection of the first vehicle event is based on a comparison of a vehicle speed of the vehicle with a threshold value.

12. The method of claim 9, wherein a current operating condition of the vehicle includes one or more of an engine load, a throttle level, a particular change in vehicle direction, or multiple changes in vehicle direction.

13. The method of claim 9, wherein the first vehicle event is related to unsafe vehicle speed.

14. The method of claim 9, wherein the first vehicle event is an imminent collision, wherein the third vehicle event is a swerve, wherein the first camera is a forward-facing camera, wherein the third camera is a sideways-facing camera, wherein the first subset of cameras excludes the sideways-facing camera, and wherein the third subset of cameras includes the sideways-facing camera.

15. The method of claim 9, wherein the first event type corresponds to vehicle events occurring at a particular speed of the vehicle, wherein the particular speed of the vehicle is less than a speed threshold, and wherein the first vehicle event occurred at a speed less than the speed threshold.

16. The method of claim 9, wherein the vehicle events include one or more of swerving, a U-turn, freewheeling, over-revving, lane-departure, short following distance, imminent collision, unsafe turning that approaches rollover, hard braking, rapid acceleration, idling, driving outside a geo-fence boundary, crossing double-yellow lines, passing on single-lane roads, a certain number of lane changes within a certain amount of time or distance, fast lane change, cutting off other vehicles during lane-change, speeding, running a red light, and/or running a stop sign.

* * * * *